Oct. 29, 1963    H. B. MORSE    3,109,081
HEATER ASSEMBLY
Filed Feb. 2, 1961
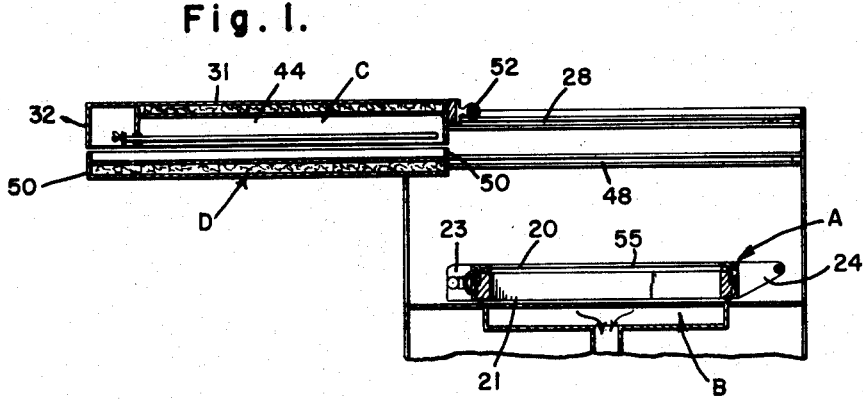
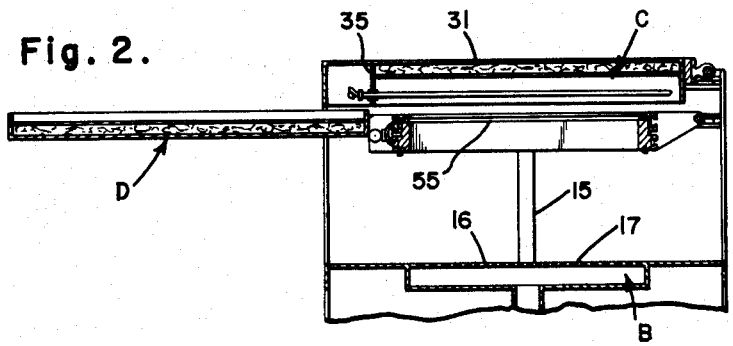
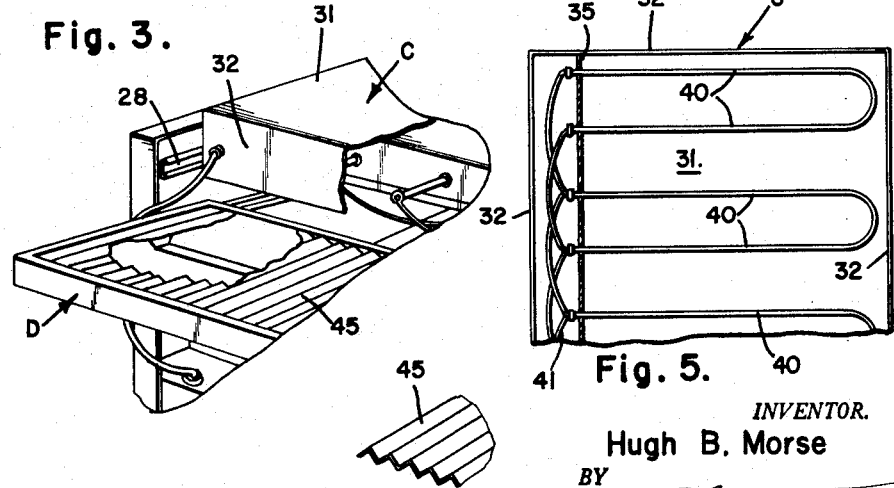
INVENTOR.
Hugh B. Morse

United States Patent Office 3,109,081
Patented Oct. 29, 1963

---

3,109,081
HEATER ASSEMBLY
Hugh B. Morse, San Jose, Calif., assignor to Avery Industries, Inc., San Mateo, Calif., a corporation of California
Filed Feb. 2, 1961, Ser. No. 86,730
6 Claims. (Cl. 219—19)

This invention relates to a novel heating mechanism for a sheet plastic vacuum forming machine.

The heater mechanism of this invention is useful for a type of packaging in which an article to be packaged is mounted on a fluid permeable board and hot film of plastic material such as polyethylene is drawn over the board while in the heated condition and while simultaneously air is drawn through the board to create an evacuated area between the board and the plastic film. Plastic formed articles can also be formed by the same process.

In such machines for creating a plastic formed package a drape frame is adapted to carry a taut sheet of plastic film. Generally some mechanism is used to raise and lower the drape frame over a platen on which the board and the article to be packaged are mounted.

A heater is placed over the drape frame in a position to heat the plastic film in the drape frame when the drape frame is in a raised position. When a plastic film has reached its requisite temperature the drape frame is lowered to a position immediately juxtaposed the platen so that the vacuum over the platen will cause the plastic sheet to conform tightly to the article and the material upon which the article is placed.

The amount of heat required to bring the polyethylene or other plastic material up to requisite temperature requires a substantial heat generating unit. This is particularly true if the cyclic rate of the machine is to be fast enough to make the operation of the machine practical. The heat from the heater must also be evenly dispersed over the entire area of the film otherwise hot and cold spots will cause an uneven temperature gradient at the film. An uneven heat distribution would cause heat gradients which might cause an uneven softening of the film so that the ultimate packaging or forming would be defective.

In the smaller machines it is extremely desirable to be able to operate the machine from a 110 volt power supply which is commonly available in almost all modern locations. The 110 volt power supply, however, is unable to provide the same amount of heat output that the 220 or 440 lines can produce. It is therefore necessary in such machines operating on the lower voltages that a more efficient and usable heating unit be employed in order to take full advantage of the heat output obtainable from the lower power source.

The principal object of this invention is to provide a heater in which the heating coils are mounted within a reflector housing which is movable from a first position in which the heating coil and reflector housing is positioned directly over a heat reflecting plate so that the heat produced by the heating element is held captive between the reflector housing and the lower reflecting plate. The housing is then slidably movable to an operative position directly over the mechanism for carrying polyethylene film in such a way that the stored heat carried in the housing is transferred to the film.

A feature and advantage of this invention is that heat is generated and stored during the periods between the heating portion of the operating cycle so that full utilization of the heat output of the heater is utilized.

Another feature and advantage of this invention is that the reflecting housing carries a captive body of hot air to an area immediately over the plastic film in which the heat gradient is uniformly distributed throughout the entire area of the film.

A further feature and advantage of this invention lies in the fact that the heater is arranged to continuously create a captive body of hot air with a mechanism for transferring the body of hot air to the material to be heated. This means the cyclic rate can be much more rapid than in other devices which do not directly depend upon the captive body of hot air or gas as obtained in the instant invention.

A still further feature and advantage of this invention is that the lower reflector element prevents heat from the heater unit from directly radiating below the machine and thus functions jointly to hold the air captive within the reflector housing and as a safety device to prevent areas immediately under the housing from unduly heating.

Another object of this invention is to provide a structure for a heating element employing a depending housing with a reflector element mounted in closely spaced relation under the housing and with the edges of the reflecting element being co-extensive with the edges of the housing so that the captive body of air is held within the housing area and with means allowing the housing to be moved to a work area position remote from the reflector unit in a horizontal track in such a way that the captive body is held within the housing.

Other objects of the present invention will become apparent upon reading the following specification and referring to the accompanying drawings in which similar characters of reference represent corresponding parts in each of the several views.

In the drawings:

FIG. 1 is a cross-sectional fragmentary view showing the novel heating unit of the invention during the non-operative portion of the operating cycle.

FIG. 2 is a view similar to FIG. 1 in which the heating unit is shown during the operative interval.

FIG. 3 is a fragmentary perspective view showing the heater element at the bottom of the cycle showing in FIG. 2.

FIG. 4 is an enlarged fragmentary perspective view of the reflecting face of the bottom reflecting unit.

FIG. 5 is a fragmentary bottom plan looking directly into the heater housing.

Referring now to the drawings the plastic film forming apparatus of FIGS. 1 and 2 is shown comprising a drape frame assembly A with means 15 for raising and lowering the frame as indicated in FIGS. 1 and 2 respectively.

A vacuum manifold area B is mounted directly to drape frame assembly A in such a way as to draw air from drape frame assembly A when the drape frame is lowered to a position as indicated in FIG. 1.

Air is drawn through the small apertures 16 in the platen 17 under the drape frame forming the top face of manifold B.

The drape frame is formed of two parts, an upper member 20 and a lower member 21, which are hinged together at 23 and are locked by a locking mechanism 24.

In operation normally lock and handle 24 are lifted so that the upper portion of the frame is swung open and a sheet of plastic film is placed on lower member 21. The upper frame is then closed and the plastic material held taut.

The heater unit for the mechanism comprises a heat generating housing C slidably mounted on a horizontal track 28 and movable to a rear position as indicated in FIG. 1 to a forward or work position as indicated in FIG. 2.

Housing C is formed with a top wall 31 and four depending side walls 32. The interior of heat generating housing C carries a depending wall 35 which has mounted thereon a plurality of resistor coils 40 which extend from wall 35 into the main area of the housing. Electrical wires 41 are arranged to deliver power to the resistance elements. The elements are spaced substantially above the bottom edge of walls 32 in such a way that walls 32 and top wall 31 form a depending hot gas containing area 44.

Immediately under heat generating housing C is mounted a horizontal reflecting plate assembly D which carries a corrugated reflecting plate 45. Assembly D is also mounted on tracks 48 for slidable horizontal movement in parallel relationship to the movement of heating element C. The spacing between the upper edge of the side walls 50 of assembly D is sufficiently close to the bottom edges of walls 32 of housing C so that there is only a negligible area available for the transference of gas from captive gas area 44.

In operation after the plastic material is placed within drape frame assembly A the assembly is caused to raise to its upper position as shown in FIG. 2. The heating element of housing C is then moved by pulling handle 52 forward until housing C is in position with hot gas contacting area 44 directly over drape frame assembly A. The unit remains in that position until the plastic film 55 carries by the drape frame is sufficiently elevated in temperature to allow for its vacuum forming. The drape frame is then moved down to apertures 17.

Previously the article to be packaged or molded has been placed on the platen so that when the polyethylene or other plastic film is in a position directly over the article to be packaged the vacuum formed in manifold B will cause the plastic to immediately conform or adhere to the article. Thereafter housing C is moved back to its rearward position as seen in FIG. 1.

It can be seen that while the housing is in the rear position there is virtually no space for gas to escape from captive gas area 44. The gas also tends to remain in the housing because it is of greater temperature than the ambient air temperature around the machine. Thus the gas within housing C can be transferred adequately with horizontal movement of the housing to the work area immediately over drape frame A.

Reflecting plate assembly D functions to reflect the heat generated from the heating element back into the captive area of housing C and also functions to prevent the existence of a large area around the lower portion of housing C through which the hot gas can escape during the dwell period of cyclic operation which might damage nearby articles.

The heat manifested by the housing in the work area thus is a combination of the direct radiation heat and conductive heat from resistor coils 40 and the stored heated air carried by the housing itself. This combination allows a much more efficient heating operation in that the air within the housing is heated during the dwell time of operation. The heat formed during this time is thus preserved for use during the heating phase of operation.

Reflecting plate assembly D is mounted for horizontal movement to move to an inward position during periods when the machine is not in use. This is done so that the machine will have no outwardly projecting elements during the storage and this facilitates the movement of the machine and storage of the machine in relatively small locations in that the projecting elements are all telescoped into confinement within the interior of the machine.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. In a plastic vacuum forming machine of the type having a work area and means for positioning sheets of plastic material in a horizontal position within the work area an improved heater comprising a first housing, means mounting said first housing for slidably horizontal movement to a first position directly over the work area and to a second position extending rearwardly from said work area, said first housing formed with a top wall with a depending edge wall, a second housing having a bottom wall and upwardly extending edge walls aligned with the edge walls of said second housing when said first housing is in the second position, the edge walls of said first and second housings being closely spaced, a heating element mounted within said first housing, and a reflecting surface mounted within said second housing.

2. A heater according to claim 1 and wherein the reflecting surface of said second housing comprises a corrugated metal plate.

3. An improved heater according to claim 1 and wherein said second housing is mounted on a horizontal track for horizontal movement to a storage position in alignment with the work area and to an operating position remote from said work area.

4. In a thermoplastic film forming machine of the type having a horizontal perforate platen forming a work area and a drape frame vertically movable above the platen, the drape frame being adapted to clamp the margins of a sheet of thermoplastic material, heating means comprising a heater unit including a substantially flat horizontal wall and depending perimeter walls attached to the same, the perimeter walls surrounding a space on the lower side of the horizontal wall, and a heating element distributed within said space, means for supporting said heater unit at a level overlying the work area and for movement in a horizontal direction between two limiting positions, one position being directly above the work area and the other being forwardly of the machine and out of the way of said work area, and a heat reflecting unit comprising a relatively flat structure having a configuration in plan corresponding to the configuration of the heater unit, said reflecting unit including a horizontal reflecting surface extending over substantially the entire horizontal area of said unit, and means for supporting said reflecting unit in a position immediately underlying the path of movement of said heater unit and in a position to directly underlie the heater unit and said space when the heater unit is in its second other limiting position.

5. Apparatus as in claim 4 in which said means for supporting the reflector unit permits movement of the same in a horizontal direction, whereby said reflector unit can be shifted to a position overlying said work area.

6. Apparatus as in claim 4 in which the reflector unit includes an upstanding perimeter wall surrounding a space within which said reflecting surface is disposed, the upper edges of said wall being disposed in proximity with the lower edges of the perimeter wall of the heater unit, when the heater unit is in its other limiting position.

References Cited in the file of this patent

UNITED STATES PATENTS

| | | |
|---|---|---|
| 1,751,219 | Seamon | Mar. 18, 1930 |
| 1,963,883 | Brinkmier | June 19, 1934 |
| 2,377,946 | Leary | June 12, 1945 |
| 2,454,993 | Crawford | Nov. 30, 1948 |
| 2,526,476 | Ham | Oct. 17, 1950 |
| 2,668,220 | Spurr | Feb. 2, 1954 |
| 2,694,131 | Carson | Nov. 9, 1954 |
| 2,702,848 | Scofield et al. | Feb. 22, 1955 |
| 2,805,523 | Hasselquist | Apr. 5, 1955 |
| 2,961,523 | Hanson et al. | Nov. 22, 1960 |